US006209691B1

(12) United States Patent
Fehring et al.

(10) Patent No.: US 6,209,691 B1
(45) Date of Patent: Apr. 3, 2001

(54) SUSPENSION DAMPER WITH SELF-ALIGNING REBOUND CUT-OFF

(75) Inventors: John David Fehring, Waynesville; Tad Vincent Machrowicz, Kettering; John Greg Mc Candless, West Chester, all of OH (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/130,191

(22) Filed: Aug. 4, 1998

(51) Int. Cl.[7] .................................................. F16F 9/34
(52) U.S. Cl. ............................... 188/322.15; 188/299.1; 267/64.15
(58) Field of Search ............................. 267/283, 64.15, 267/64.23; 188/299.1, 322.15, 322.16, 322.17, 322.18, 322.19, 317, 280, 281, 284, 287

(56) References Cited

U.S. PATENT DOCUMENTS

| 2,379,750 | 7/1945 | Rossman | 188/284 |
|---|---|---|---|
| 2,717,058 | 9/1955 | Brundrett | 188/88 |
| 3,007,550 | 11/1961 | Long, Jr. | 188/88 |
| 3,038,560 | 6/1962 | Long, Jr. | 188/88 |
| 3,621,949 | 11/1971 | Watson | 188/284 |
| 3,804,217 | 4/1974 | Keijzer et al. | 188/322.17 |
| 3,837,945 | 9/1974 | Pierle | 188/322.17 |
| 4,185,721 | 1/1980 | Karklins et al. | 188/322 |
| 4,245,825 | 1/1981 | Ohtomo et al. | 188/315 |
| 4,342,447 | 8/1982 | Marx | 188/322.17 |
| 4,397,452 | 8/1983 | Fouts | 267/220 |
| 4,502,575 | 3/1985 | Fukushima et al. | 188/282 |
| 4,838,393 | 6/1989 | Mourray et al. | 188/284 |
| 4,852,703 | 8/1989 | Nishimoto | 188/284 |
| 4,989,701 | 2/1991 | Yamaoka et al. | 188/322.17 |
| 5,024,301 | 6/1991 | Cook | 188/284 |
| 5,277,284 | 1/1994 | Pradel et al. | 188/322.17 |
| 5,580,034 | 12/1996 | Cheng | 188/322.17 |
| 5,690,195 | 11/1997 | Kruckemeyer | 188/299 |
| 5,749,596 | * | 5/1998 | Jensen et al. | 280/689 |
| 5,810,130 | * | 9/1998 | Mc Candless | 188/322.22 |

FOREIGN PATENT DOCUMENTS

| 1864225 | 12/1962 | (DE) . |
|---|---|---|
| 1916487 | 10/1969 | (DE) . |
| 2138711 | 2/1973 | (DE) . |
| 2143181 | 3/1973 | (DE) . |
| 4036522 | 10/1991 | (DE) . |
| 0639726 | 2/1995 | (EP) . |
| 2317563 | 2/1977 | (FR) . |
| 887191 | 1/1962 | (GB) . |
| 2039664 | 8/1980 | (GB) . |
| 2107821 | 5/1983 | (GB) . |

OTHER PUBLICATIONS

Reimpell J., "Fahrwektechnik: Stobdampfer" Wurzburg: Vogel–Buchverlag, 1983 Edition pp. 5, 30–31, 94–105.

"How to Beef Up a Suspension", 903 Machine Design, 67(1995)Apr. 6, No. 7, Cleveland, OH.

* cited by examiner

Primary Examiner—Matthew C. Graham
Assistant Examiner—Pamela J. Rodriguez
(74) Attorney, Agent, or Firm—Robert M. Sigler

(57) ABSTRACT

A suspension damper includes a tube and a damping piston assembly disposed within the tube and slidably mounted therein for reciprocal movement in the tube. The suspension damper also includes a piston rod extending through the tube and connected to the damping piston assembly, a rod guide assembly closing one end of the tube and a self-aligning rebound cut-off disc carried in the tube between the rod guide assembly and the damping piston assembly and cooperating with the rod guide assembly to provide a rebound cut-off effect and to compensate for misalignment between the piston rod and the damping piston assembly.

19 Claims, 3 Drawing Sheets

SUSPENSION DAMPER WITH SELF-ALIGNING REBOUND CUT-OFF

TECHNICAL FIELD

The present invention relates to a suspension damper with rebound cut-off and, more particularly, to a suspension damper with a hydraulic self-aligning rebound cut-off feature that minimizes rebound cut-off packaging requirements and increases the useable travel region of the damper.

BACKGROUND OF THE INVENTION

A damper operates in vehicle suspensions as a damping device controlling the sprung (body) and unsprung (wheels) masses of a vehicle by reducing loads or vertical accelerations normally transmitted from the wheels to the body. Damping is accomplished by converting kinetic energy into thermal energy and dissipating the heat. Conventionally, hydraulic dampers include a piston with a connected piston rod slidably carried in a fluid-filled tube and separating the tube into extension and compression chambers. A rod guide at the top end of the tube closes the extension chamber and slidably engages the piston rod. In many applications, the suspension damper is called upon to limit the full extension travel of the suspension system.

In some vehicle applications, mechanical rebound stops that are fixed to the piston rod and engagable with the rod guide are known to provide a means of limiting the maximum extension travel of the piston rod from the damper. A typical mechanical rebound stop is generally equipped with a resilient bumper made of material such as rubber or urethane. The bumper is designed to cushion the engagement of the damping piston with the rod guide at the end of damper travel in the extension direction. This type of a mechanical stop tends to result in somewhat of an abrupt means of limiting travel during rebound. It has also been found that in severe applications, a resilient bumper material may undesirably experience heat degradation when the bumper absorbs the entire rebound stop load.

Providing a hydraulic rebound cut-off feature with a shock absorber form of damper is also known. Such a device is disclosed in U.S. Pat. No. 3,621,949 which issued Nov. 23, 1971. That hydraulic rebound cut-off feature uses an axial rod flow path communicating fluid between the extension and compression chambers and operates as an additional damping flow path with the typical piston valve orifices. When the piston approaches full extension, the axial rod flow path is closed by the rod guide, significantly increasing damping force and slowing extension directed travel. This prior art device undesirably necessitates changes to the rod guide to prevent blow-by of hydraulic fluid caused by high pressure which builds in the lower entrance segment of the rod guide and requires a larger rod I.D. for sufficient flow capacity.

Yet another type of known hydraulic rebound cut-off feature utilizes a rebound cut-off piston in conjunction with the damping piston. Such a device is described in U.S. Pat. No. 3,007,550 which issued Nov. 7, 1961. According to this prior art design, a fixed/clamped disc or disc stack on a secondary or rebound cut-off piston coacts with the damping piston to effect a substantial entrapment of fluid in the extension chamber of the shock absorber as the damping piston approaches full rebound. However, this device effects an increase in dead length and resistance to movement only when the velocity of movement of the damping piston exceeds a certain predetermined value. In so doing, a rather complicated assembly is used that undesirably detracts from active length of the damper.

Particularly with monotube design dampers, maximizing active length is critical. This is because a typical monotube damper carries a gas cup that separates out a gas chamber within the single tube of the device. The gas chamber is expansible and contractible to account for the changing volume of space occupied by the piston rod entering and exiting the tube and accommodates thermal expansion of the fluid. Presence of the gas chamber minimizes the amount of active length that can be utilized by other features such as the rebound cut-off device. A piston rod flow design is not possible for the rebound cut-off device because the hollow rod is used for the electrode assembly and has an insufficient diameter. Also, a fixed/clamped disc would increase disc to sleeve clearance, thereby reducing the rebound cutoff effect. Therefore, there is a need in the art for a self-aligning rebound cut-off feature for a monotube damper with minimal impact on damper dead length.

SUMMARY OF THE INVENTION

According to the present invention a robust, economic, uncomplicated and self-aligning rebound cut-off feature of a suspension damper is provided. An aspect of the present invention encompasses providing a rebound cut-off feature which can be added to a controlled monotube damper with minimal impact on damper dead length, has fewer parts, and assembly is relatively easy.

According to this aspect, a suspension damper includes a tube and a damping piston assembly disposed within the tube and slidably mounted therein for reciprocal movement in the tube. The suspension damper also includes a rod guide assembly closing one end of the tube and a self-aligning rebound cut-off disc carried in the tube between the rod guide assembly and the piston damping assembly and cooperating with the rod guide assembly to provide a rebound cut-off effect and to compensate for misalignment between the piston rod and the piston damping assembly.

Advantageously, the present invention incorporates a disc and flask or sleeve combination to provide the rebound cut-off feature. As a result, the present invention provides shorter dead length while requiring tight tolerances on only the disc OD and sleeve ID. The rebound cut-off effect can be tuned by altering the disc to sleeve clearance, changing the length of the sleeve (rebound cut-off travel) and disc lift.

Other features and advantages of the present invention will be readily appreciated as the same becomes better understood after reading the subsequent description when considered in connection with the accompanying drawings.

DETAILED DESCRIPTION OF THE PRESENTLY PREFERRED EMBODIMENT

Figure 1:
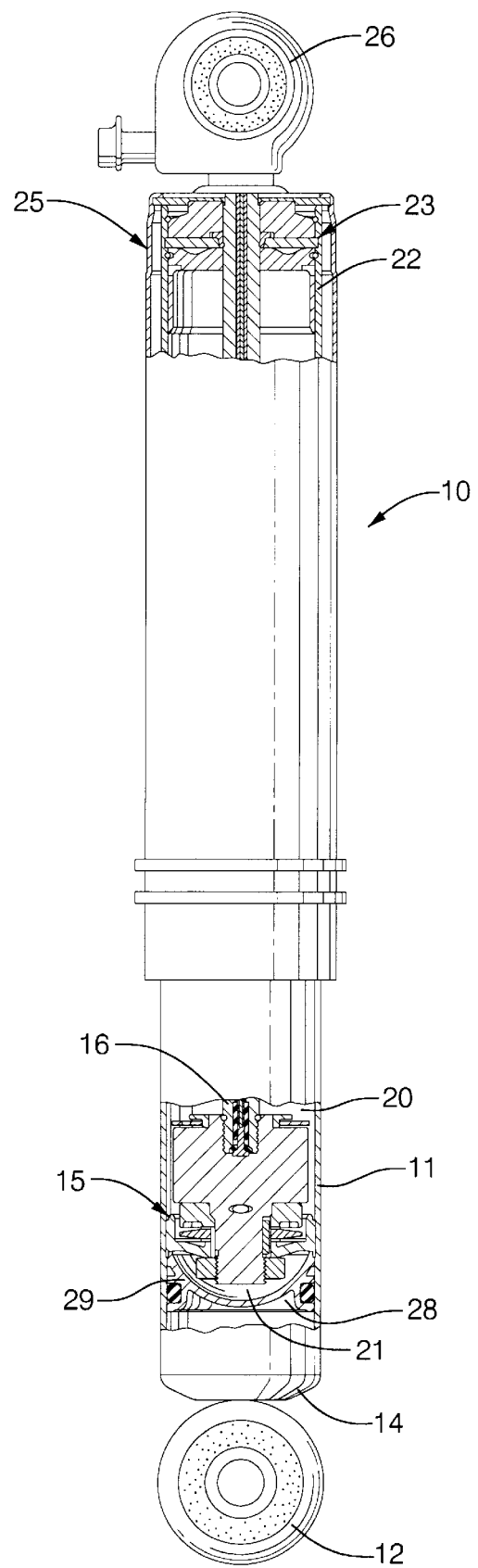
FIG. 1 is a fragmentary cross-sectional view of a suspension damper illustrating features of the present invention.

Referring to the drawings, illustrated in FIG. 1 is one embodiment of a suspension damper, according to the present invention, for a vehicle suspension embodied as a shock absorber 10. At the outset it will be apparent to one skilled in the art that the present invention, though disclosed through monotube type shock absorber embodiments, it not so limited in use and will lend itself to applications in multiple tube shock absorbers and in other types of suspension dampers. Application of the present invention in monotube suspension dampers is particularly expedient however, since active travel length is at a premium.

With specificity, the shock absorber 10 includes an elongated cylindrical tube 11 having an attachment fitting 12 secured thereto for connection to a wheel assembly (not illustrated), as the unsprung mass in a vehicle's suspension system. The tube 11 is closed at its lower end by a base cup 14 which is secured thereto through a conventional means such as welding, or is formed as an integral part thereof. Tube 11 contains a quantity of oil (no reference number), that is used as a damping medium in the shock absorber 10. The shock absorber 10 includes a damping piston assembly 15 slidably mounted for reciprocal movement in the tube 11 and affixed to a piston rod 16 as will be subsequently described. The damping piston assembly 15 hydraulically separates the interior of tube 11 into two expansible and contractible working chambers designated as extension chamber 20 and compression chamber 21.

An upper end 22 of the tube 11 is in general, provided with fastening devices such as snap rings and grooves (or is otherwise formed) to securely carry a rod guide assembly 23. The piston rod 16 extends through the extension chamber 20 and rod guide assembly 23 exiting the tube 11. The piston rod 16 includes an annular shoulder (not shown) that carries a generally cylindrical dust tube assembly 25 which extends down over the tube 11. An attachment fitting 26 is threaded onto, or optionally otherwise suitably engaged with the end of the piston rod 16. The attachment fitting 26 is provided for attachment to the body of a vehicle (not illustrated), as the sprung mass of the suspension system. Therefore, in response to relative movement between the wheel assembly and the vehicle, the damping piston assembly 15 reciprocally moves within the tube 11.

The oil that is carried in the tube 11 provides a damping medium for the shock absorber 10. During a compression stroke, as the damping piston assembly 15 slides downward in the tube 11, an increasing volumetric amount of the piston rod 16 enters the tube 11 through the rod guide assembly 23. Therefore, a means of accommodating this increased volume within the shock absorber 10 must be provided. Accordingly, a compressible gas charge is carried within a compensation chamber 28 which is separated from the compression chamber 21 by a reciprocal gas cup assembly 29. As the increasing amount of the piston rod 16 enters the tube 11 during a compression stroke of the shock absorber 10, the gas within the compensation chamber 28 is compressed as the gas cup assembly 29 slides downward in response to displacement of the noncompressible hydraulic fluid carried within the compression chamber 21 and extension chamber 20.

Figure 2:
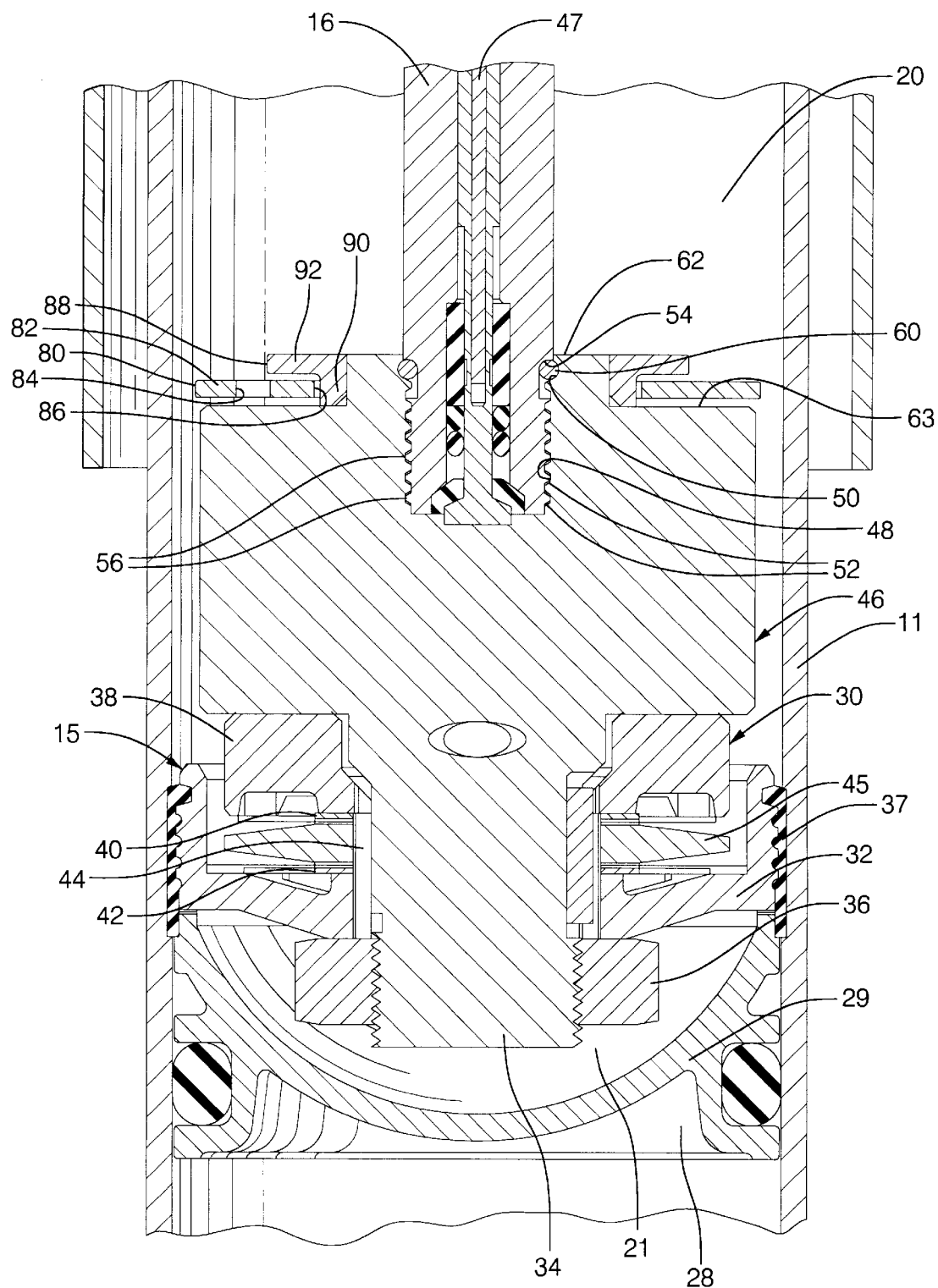
FIG. 2 is a fragmentary cross-sectional view of the suspension damper of FIG. 1 detailing the self-aligning rebound cut-off feature.

In greater detail in FIG. 2, the damping piston assembly 15 includes a control valve assembly 30 at a lower end thereof. A piston cup 32 is received on a cylindrical body 34 of the control valve assembly 30 and is fixed thereon by a threaded nut 36. The piston cup 32 includes a seal ring 37 made of a low friction material. The seal ring 37 sealingly bears against the tube 11 providing fluid separation between the compression chamber 21 and the extension chamber 20. It should be appreciated that the control valve assembly 30 is similar to that disclosed in U.S. Pat. No. 5,690,195, issued Nov. 25, 1997, the disclosure of which is hereby incorporated by reference.

The control valve assembly 30 also includes a valve plate 38 positioned on the cylindrical body 34 partially within the piston cup 32 and supports a bi-directional, deflectable, single annular valve disc 40. A second bi-directional, deflectable, single annular valve disc 42 is supported by the piston cup 32. A control valve 44 is carried within the control valve assembly 30 in a central bore and operates to selectively provide a flow path through the control valve assembly 30. The control valve assembly 30 further includes an annular stop plate 45 positioned over the cylindrical body 34 to maintain the components in an axial position. It should be appreciated that the structure and operation of the control valve assembly 30 is similar to that disclosed in U.S. Pat. No. 5,690,195.

The damping piston assembly 15 also includes a solenoid assembly 46 at an upper end thereof. The electrical circuit for supplying the power to the solenoid assembly 46 includes an electrical lead 47 which extends through an opening in the top of the piston rod 16 for connection to control circuitry (not shown). The electrical lead 47 also engages a contact (not shown) of the solenoid assembly 46. It should be appreciated that the structure and operation of the solenoid assembly 46 is similar to that disclosed in U.S. Pat. No. 5,690,195.

The damping piston assembly 15 includes a central bore 48 in the solenoid assembly 46 having an annular shoulder 50 and a plurality of internal threads 52 disposed axially below the shoulder 50. The shoulder 50 is generally arcuate in cross-sectional shape. The piston rod 16 has an annular shoulder 54 as a lower end thereof and a plurality of external threads 56 disposed axially below the shoulder 54. The shoulder 54 is generally arcuate in cross-sectional shape. It should be appreciated that the bottom of the piston rod 16 and the top of the solenoid assembly 46 are connected together by mating of the threads 52 and 56.

The shock absorber 10 also includes an aligning/retaining ring 60 positioned between the shoulder 54 of the piston rod 16 and the shoulder 50 of the solenoid assembly 46. The aligning/retaining ring 60 is circular in cross-section and matingly engages the shoulders 50 and 54. The aligning/retaining ring 60 is made of a rigid material such as steel. The complimentary and mating aligning/retaining ring 60 and the shoulders 50 and 54 work together to provide sufficient area for proper clamp load. The ring 60 also provides concentricity and perpendicularly between the piston rod 16 and the damping piston assembly 15. It should be appreciated that if the aligning/retaining ring 60 is disposed below a back surface 62 of the solenoid assembly 46, the back surface 62 can be staked or crimped over the aligning/retaining ring 60 to prevent the piston rod 16 from exiting or unscrewing from the solenoid assembly 46.

Figure 3:
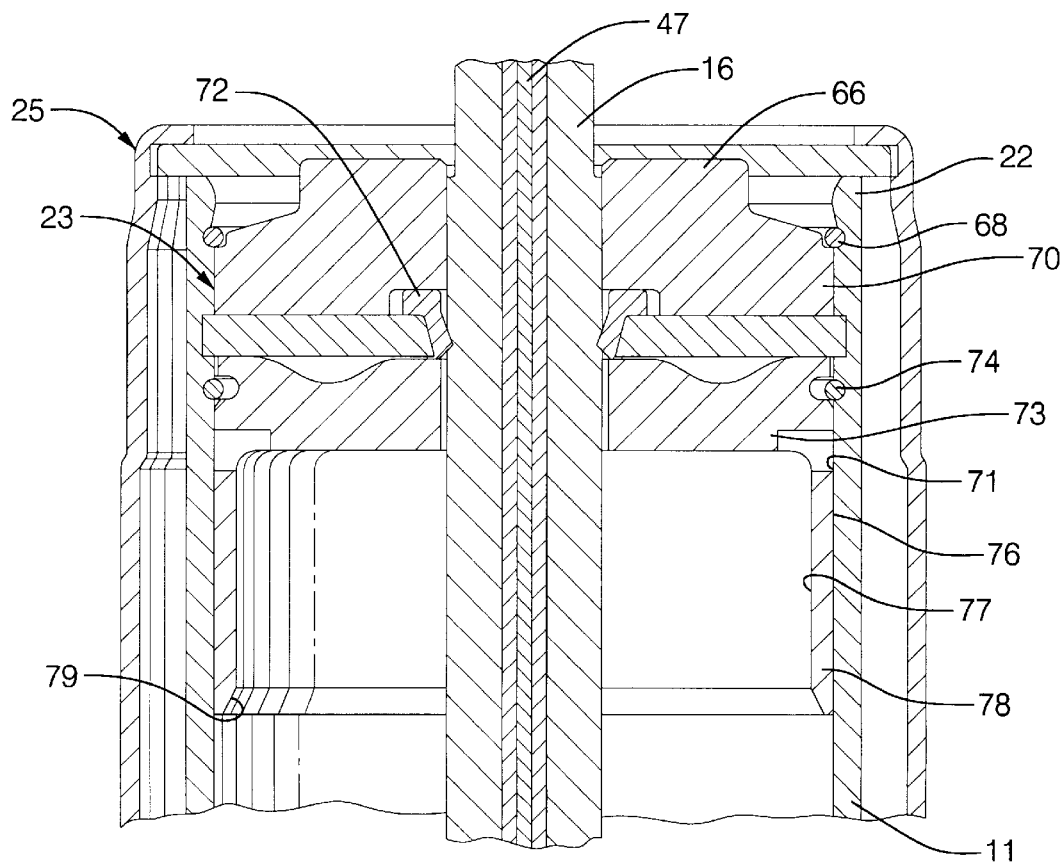
FIG. 3 is a fragmentary cross-sectional view of the suspension damper of FIG. 1 detailing the rod guide assembly.

Referring to FIG. 3, the rod guide assembly 23, according to the present invention, includes a metal rod guide body 66 surrounding the piston rod 16. The rod guide body 66 is fixed in the end 22 of the tube 11 by a snap ring 68 and provides lateral support and a bearing surface for the piston rod 16. An annular static seal 70 is carried against the rod guide body 66 and is securely sealed therewith and with an inner wall 71 of the tube 11. A dynamic seal 72 is carried about the piston rod 16 providing a fluid tight closure at the rod guide assembly 23 and is positioned between the rod guide body 66 and the static seal 70. A rebound cut-off flask 73 is fixed against the static seal 70 and is maintained in position by a snap ring 74 that engages the tube 11. The rebound cut-off flask 73 has an outer periphery 76 and a chamber 77 formed by a cylindrical wall 78 that extends axially toward the piston assembly and ends with a chamfered inner face 79 as shown. The flask 73 is formed as a metal stamping or a machined part.

Referring to FIGS. 1 and 2, the shock absorber 10 includes a hydraulic self-aligning rebound cut-off disc 80, according to the present invention, carried by the damping piston assembly 15. The self-aligning rebound cut-off disc 80 has an annular body 82 with a plurality of fluid apertures 84 spaced circumferentially and extending therethrough to allow fluid flow through the disc 80. The self-aligning rebound cut-off disc 80 has an outer diameter which is sized for a close slip-fit within the inner diameter of cylindrical wall 78 of the flask 73. The self-aligning rebound cut-off disc 80 includes an oversized center hole 86 extending through the body 82 through which retainer 88 passes. The shock absorber 10 also includes a retainer 88 for retaining the self-aligning rebound cut-off disc 80 to the solenoid assembly 46 of the damping piston assembly 15. The retainer 88 has an axial extending cylindrical wall 90 passing through the center hole 86 and about the shoulder 50. The retainer 88 also has a flange 92 extending radially from the wall 90 to retain the self-aligning rebound cut-off disc 80 between the back surface 62 of the solenoid assembly 46 and the flange 92 of the retainer 88. It should be appreciated that the retainer 88 is press-fit and riveted radially onto the shoulder 50. It should be appreciated that there is sufficient clearance between a radially outer portion 63 of the inner diameter (ID) of the center hole 86 of the self-aligning rebound cut-off disc 80 loosely, that is, with some allowed axial movement, and the outer diameter (OD) of the wall 90 of the retainer 88 to handle all concentric misalignments of the piston rod 16 to the damping piston assembly 15, in turn, to the tube 11, in turn, to the rod guide assembly 23, in turn, to the piston rod 16.

In operation of the shock absorber 10, the rebound cut-off effect is generated when the rebound cut-off disc 80 passes into the chamber 77 of the rebound cut-off flask 73 and traps the hydraulic fluid. On reversal of the compression stroke, the rebound cut-off disc 80 lifts off the back surface 62 of the solenoid assembly 46 and fluid flow is established around the rebound cut-off disc 80 through the fluid apertures 84. It should be appreciated that the rebound cut-off back fill can be tuned by changing the lift off height of the disc 80 number and size of the apertures 84 in the disc 80 and adding a return spring (not shown) between the rebound cut-off disc 80 and the retainer 88.

Figure 4:
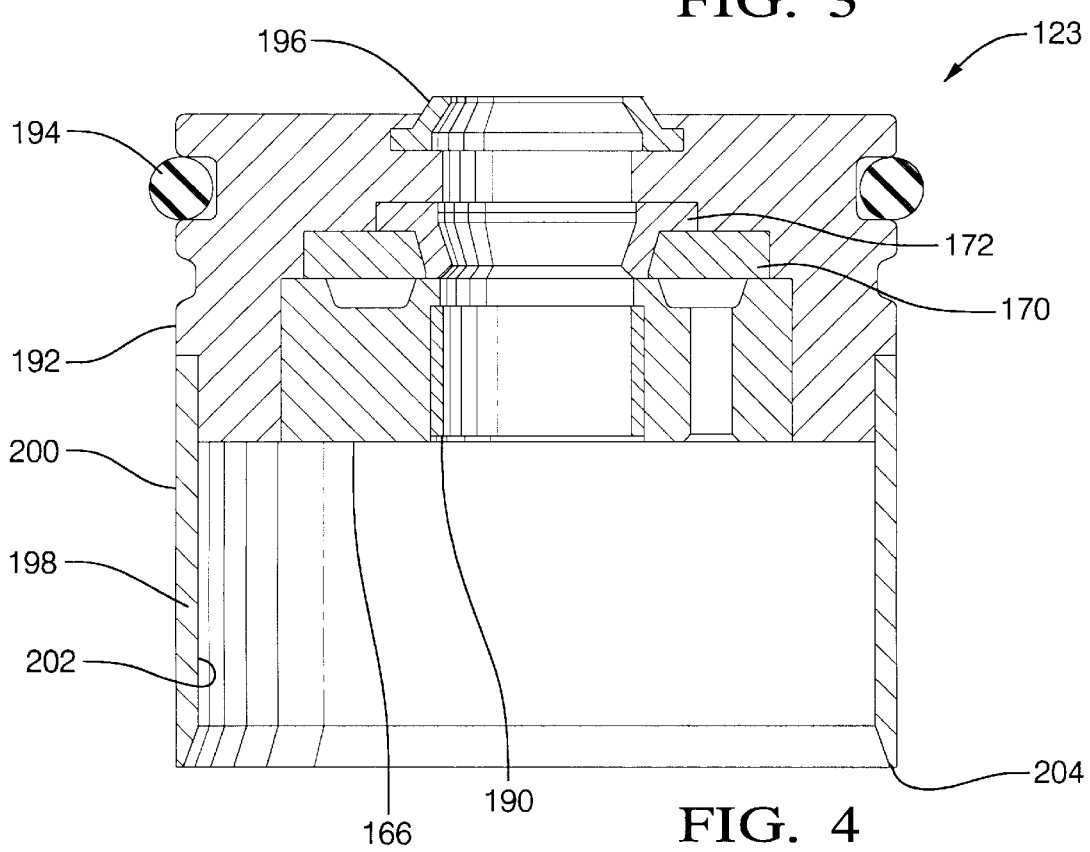
FIG. 4 is a fragmentary cross-sectional view of the suspension damper of FIG. 1 detailing another embodiment of the rod guide assembly.

Referring to FIG. 4, another embodiment 123, according to the present invention, of the rod guide assembly 23 is shown. Like parts of the rod guide assembly 23 have like reference numerals increased by one hundred (100). The rod guide assembly 123 includes a rod guide body 166, static seal 170 and dynamic seal 172. However, the rod guide assembly 123 includes a rod guide bushing 190 disposed within the rod guide body 166 and surrounding the piston rod 16. The rod guide assembly 123 also includes a cover seal 192 surrounding the rod guide body 166, static seal 170 and dynamic seal 172 and held against the tube 11 by an o-ring 194. The cover seal 192 includes a scraper 196 at one end and a rebound cut-off sleeve 198 at the other end. The rebound cut-off sleeve 198 has an outer periphery 200 and chamber 202 formed by a cylindrical wall that extends axially to a face 204. It should be appreciated that the rebound cut-off effect is generated when the rebound cut-off disc 80 passes into the chamber 202 of the sleeve 198 and traps the fluid. It should also be appreciated that a tight clearance can be held between the OD of the rebound cut-off disc 80 and the ID of the sleeve 198.

It should further be appreciated that the clearance between the ID of the disc 80 and the OD of the retainer 88 is sized to position the disc 80 so that the OD of the disc 80 clears the face 204, internally chamfered as shown of the sleeve 198 even though the disc 80 moves slightly in a radial direction on the cylindrical wall 90.

In accordance with the foregoing description, the shock absorber 10 of the monotube gas charged type includes a competitive rebound cut-off feature with desirable operating characteristics and which does not unduly subtract from the active travel length thereof. Advantageously from a cost and manufacturing standpoint, relative few dimensions of components in the rebound cut-off feature are required to be made to exacting standards. The dimension of the outside diameter of the rebound cut-off disc 80 and the dimension of the inner diameter of the flask 73 or sleeve 198 is important. The remaining components of the rebound cut-off feature are manufactured to more liberal dimensional standards. Advantageously, the self-aligning rebound cut-off feature of the present invention is robust, operationally desirable and relatively competitively manufactured.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A suspension damper comprising:
   a tube;
   a damping piston assembly disposed within the tube and slidably mounted therein for reciprocal movement in the tube;
   a piston rod extending through the tube and connected to the damping piston assembly;
   a rod guide assembly closing one end of the tube; and
   a self-aligning rebound cut-off disc carried in the tube between the rod guide assembly and the damping piston assembly and cooperating with the rod guide assembly to provide a rebound cut-off effect and to compensate for misalignment between the piston rod and the damping piston assembly the damping piston assembly including a retainer for retaining the self-aligning rebound cut-off disc thereto.

2. A suspension damper as set forth in claim 1 wherein the retainer has a cylindrical wall extending axially and a flange extending radially from one end of the cylindrical wall for loosely retaining the self-aligning rebound cut-off disc so that it may engage and disengage an axial end of the damping piston assembly.

3. A suspension damper as set forth in claim 2 wherein the self-aligning rebound cut-off disc has an aperture therethrough, the aperture being significantly blocked by the piston assembly when the self-aligning rebound cut-off disc engages the piston assembly and unblocked when the self-aligning rebound cut-off disc disengages from the piston assembly.

4. A suspension damper as set forth in claim 1 wherein the rod guide assembly includes a flask disposed within the tube and having a cylindrical wall extending axially and forming a chamber therein open toward the piston assembly to receive the rebound cut-off disc therein with movement of the piston assembly near full extension of the damper.

5. A suspension damper as set forth in claim 1 wherein the rod guide assembly includes a sleeve disposed within the tube and extending axially and forming a chamber therein open toward the piston assembly to receive the rebound cut-off disc therein with movement of the piston assembly near full extension of the damper.

6. A suspension damper comprising:

a tube;

a damping piston assembly disposed within the tube and slidably mounted therein for reciprocal movement in the tube;

a piston rod extending through the tube and connected to the damping piston assembly;

a rod guide assembly closing one end of the tube; and a self-aligning rebound cut-off disc carried in the tube between the rod guide assembly and the damping piston assembly and cooperating with the rod guide assembly to provide a rebound cut-off effect and to compensate for misalignment between the piston rod and the damping piston assembly, the damper including a retainer for retaining the self-aligning rebound cut-off disc to the damping piston assembly, wherein the damping piston assembly includes a shoulder and the retainer includes an aperture extending therethrough to receive the shoulder.

7. A monotube shock absorber comprising:

a tube;

a damping piston assembly disposed within the tube and slidably mounted for reciprocal movement in the tube;

a piston rod extending through the tube and connected to the damping piston assembly;

a rod guide assembly closing one end of the tube; and a self-aligning rebound cut-off disc carried in the tube between the rod guide assembly and the damping piston assembly and cooperating with the rod guide assembly to provide a rebound cut-off effect and to compensate for misalignment between the piston rod and the damping piston assembly, the damping piston assembly including a retainer for retaining the self-aligning rebound cut-off disc thereto.

8. A monotube shock absorber as set forth in claim 7 wherein the retainer has a cylindrical wall extending axially through the central aperture and a flange extending radially from one end of the cylindrical wall for loosely retaining the self-aligning rebound cut-off disc so that it may engage and disengage an axial end of the damping piston assembly.

9. A monotube shock absorber as set forth in claim 8 wherein the rod guide assembly includes a flask disposed within the tube and having a cylindrical wall extending axially and forming a chamber open toward the piston assembly to receive the rebound cut-off disc therein with movement of the piston assembly near full extension of the damper.

10. A monotube shock absorber as set forth in claim 9 wherein the retainer has an axially extending cylindrical wall having an outer diameter, the self-aligning rebound cut-off disc has a central aperture with an inner diameter surrounding the outer diameter of the axially extending cylindrical wall and radially spaced therefrom for axially aligning relative movement therebetween, and the cylindrical wall of the flask is chamfered at an axial end adjacent the piston assembly to facilitate axial alignment of the self-aligning rebound cut-off disc as it enters the chamber.

11. A monotube shock absorber comprising:

a tube;

a damping piston assembly disposed within the tube and slidably mounted for reciprocal movement in the tube;

a piston rod extending through the tube and connected to the damping piston assembly;

a rod guide assembly closing one end of the tube; and a self-aligning rebound cut-off disc carried in the tube between the rod guide assembly and the damping piston assembly and cooperating with the rod guide assembly to provide a rebound cut-off effect and to compensate for misalignment between the piston rod and the damping piston assembly, the damper including a retainer for retaining the self-aligning rebound cut-off disc to the damping piston assembly, wherein the damping piston assembly includes a shoulder and the retainer includes an aperture extending therethrough to receive the shoulder.

12. A monotube shock absorber as set forth in claim 11 wherein retainer has a cylindrical wall extending axially through the central aperture and a flange extending radially from one end of the cylindrical wall.

13. A monotube shock absorber as set forth in claim 12 wherein the rod guide assembly includes a flask disposed within the tube and having a cylindrical wall extending axially and forming a chamber.

14. A monotube shock absorber as set forth in claim 12 wherein the rod guide assembly includes a sleeve disposed within the tube and extending axially and forming a chamber therein.

15. A monotube shock absorber as set forth in claim 12 wherein the rod guide assembly includes a sleeve disposed within the tube and extending axially and forming a chamber therein open toward the piston assembly to receive the rebound cut-off disc therein with movement of the piston assembly near full extension of the damper.

16. A monotube shock absorber as set forth in claim 15 wherein the retainer has an axially extending cylindrical wall having an outer diameter, the self-aligning rebound cut-off disc has a central aperture with an inner diameter surrounding the outer diameter of the axially extending cylindrical wall and radially spaced therefrom for axially aligning relative movement therebetween, and the sleeve is chamfered at an axial end adjacent the piston assembly to facilitate alignment of the self-aligning rebound cut-off disc as it enters the chamber.

17. A monotube suspension damper comprising:

a tube;

a damping piston assembly disposed within the tube and slidably mounted for reciprocal movement in the tube, the damping piston assembly having a shoulder and a retainer;

a piston rod extending through the tube and connected to the damping piston assembly;

a rod guide assembly closing one end of the tube and having a cylindrical wall extending axially and forming a chamber therein wherein the cylindrical wall has face directed into the chamber; and a self-aligning rebound cut-off disc having a central aperture and a plurality of fluid apertures extending therethrough wherein the retainer is disposed about the shoulder and extends through the central aperture to retain the disc to the damping piston assembly wherein the disc in movable relative to the damping piston assembly wherein an outer diameter of the retainer is sized to position the disc so that the disc clears the face even though the disc moves.

18. A monotube suspension damper as set forth in claim 17 wherein the retainer has a cylindrical wall extending axially and a flange extending radially from one end of the cylindrical wall.

19. A monotube suspension damper as set forth in claim 18 wherein the self-aligning rebound cut-off disc has a circular shape.

* * * * *